Nov. 4, 1952 E. R. PRICE 2,616,538
TRANSMISSION OPERATING MECHANISM
Filed Nov. 16, 1946 8 Sheets-Sheet 2

INVENTOR.
EARL R. PRICE.
BY
H. O. Clayton
ATTORNEY.

Nov. 4, 1952     E. R. PRICE     2,616,538
TRANSMISSION OPERATING MECHANISM
Filed Nov. 16, 1946     8 Sheets-Sheet 4
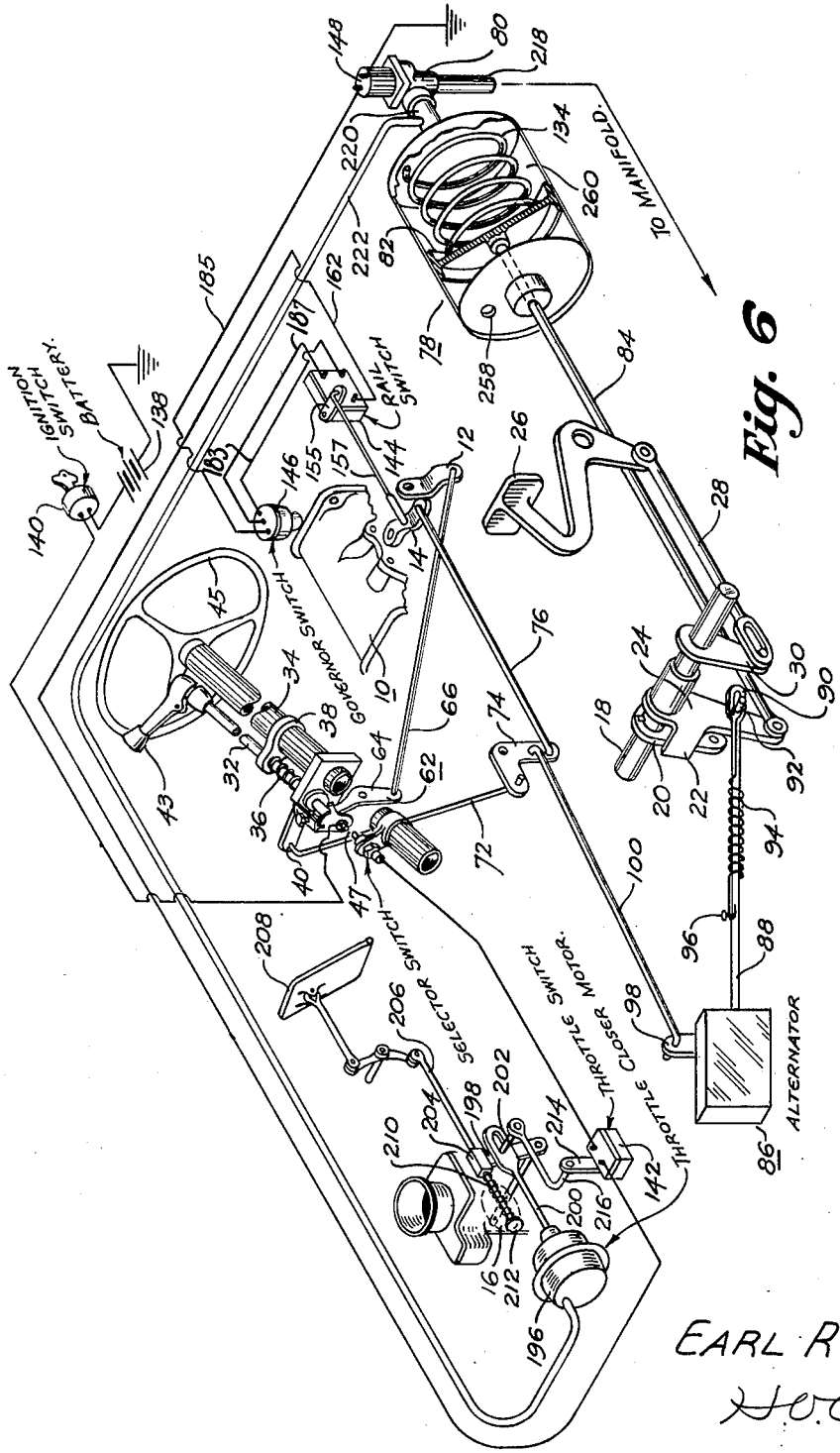
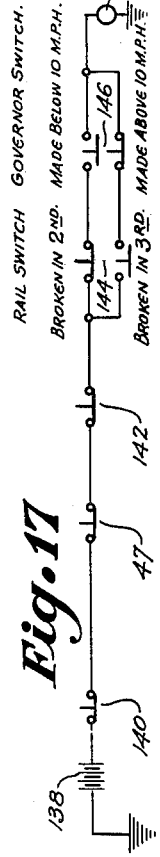
Inventor
EARL R. PRICE.
Attorney INVENTOR.
EARL R. PRICE.
BY
H.O. Clayton
ATTORNEY Nov. 4, 1952  E. R. PRICE  2,616,538
TRANSMISSION OPERATING MECHANISM
Filed Nov. 16, 1946  8 Sheets-Sheet 7

Inventor
EARL R. PRICE.
H.O. Clayton
By
Attorney

Nov. 4, 1952        E. R. PRICE        2,616,538

TRANSMISSION OPERATING MECHANISM

Filed Nov. 16, 1946        8 Sheets-Sheet 8

Inventor
EARL R. PRICE.
By H.O. Clayton
Attorney

Patented Nov. 4, 1952

2,616,538

UNITED STATES PATENT OFFICE 2,616,538

TRANSMISSION OPERATING MECHANISM

Earl R. Price, South Bend, Ind., assignor to Bendix Aviation Corporation, South Bend, Ind., a corporation of Delaware Application November 16, 1946, Serial No. 710,353

7 Claims. (Cl. 192—3.5)

This invention relates in general to the power transmission mechanism of an automotive vehicle and in particular to means for operating the change speed transmission of said mechanism.

One of the objects of my invention is to provide, in an automotive vehicle including a fluid coupling and a three speeds forward and reverse transmission, a simple mechanism, power operated in part, for operating said transmission, all of the settings thereof being effected by a manual operation of said mechanism if the driver desires to so operate the mechanism, and the second and high gear settings of the transmission, and the operation of the friction clutch to facilitate said settings, being effected by power means if the driver elects this operation of the mechanism.

Yet another object of my invention is to provide, in an automotive vehicle including a friction clutch and a change speed transmission, for example a three speeds forward and reverse transmission or a two speed axle; means, including a single acting fluid pressure motor, for alternately establishing the transmission in two different settings and for operating the clutch to facilitate said operations of the transmission; and one of the principal objects of my invention is to include, in the force transmitting means interconnecting the power element of said motor and the transmission, a direction changing, that is cycling mechanism, whereby successive power strokes of the power element of the motor serve to effect a reciprocatory movement of a transmission operating member to alternately establish the transmission in the aforementioned two settings.

Yet another important object of my invention is to provide a compact, reliable, and cheaply manufactured cycling unit adapted for use in the transmission operated mechanism of an automotive vehicle.

A further object of my invention is to provide a cycling mechanism interconnecting the piston of a fluid pressure motor with a transmission operating member, said mechanism including a piston and spring operated lever yieldingly connected, by means including a rod, with a transmission operating two-armed crank, said rod being alternately connected, by means including a spring, to first one arm and then the other of the crank.

Yet another object of my invention is to provide means interconnecting a power input member of a power plant with a power output member of the plant, said means including a change speed transmission mechanism, a friction clutch interconnecting the latter mechanism with the input member, and power means for operating the transmission and clutch including a pressure differential operated motor, valve means for controlling the operation of said motor, means, including a manually operable switch, for controlling the operation of said valve means, and force transmitting means, including a cycling mechanism, interconnecting the power element of the motor, the friction clutch and transmission, said force transmitting means being operative to successively effect a disengagement of the clutch and an operation of the transmission, the operation of the latter being such as to alternately effect two different settings thereof.

My invention also contemplates the provision of an alternator or direction changing mechanism adapted to be incorporated in the connection between a change speed transmission and the power element of a fluid pressure motor said mechanism including a force transmitting link connected to the power element of the motor, a two-armed crank member operably connected to the transmission and adapted to successively be rotated in opposite directions, together with force transmitting means interconnecting the crank and link and serving, with successive movements of the link in one direction, to effect the aforementioned reciprocatory movement of the lever.

Yet another object of my invention is to provide a mechanism interconnecting the power element of a single acting fluid pressure motor with a crank to be successively rotated in one direction and then the opposite direction, said mechanism including a two-armed crank member, a force transmitting link pivotally connected to one arm of said crank, a force transmitting link pivotally connected to the other arm of said crank and lying alongside the first mentioned link, and force transmitting means connected to said power element and including an element which is successively moved into contact with first one link and then the other link.

Yet another object of my invention is to provide a cycling mechanism adapted for use as a part of the transmission operating mechanism of the power plant of an automotive vehicle, said cycling mechanism including a power input member operably connected to an output member by means operative to effect a reciprocatory power movement of the output member with successive operations of the input member in one direction.

Other objects of the invention and desirable details of construction and combination of parts will become apparent from the following descriptions of preferred embodiments of my invention, which descriptions are taken in conjunction with the accompanying drawings, in which:

Figure 6 is a diagrammatic view, similar to Figure 1, disclosing the combination of elements constituting one of the principal features of my invention said combination including the preferred embodiment of my alternator mechanism;

Figure 17 is a wiring diagram of the electrical mechanism disclosed in Figures 1 and 6.

Figure 1:
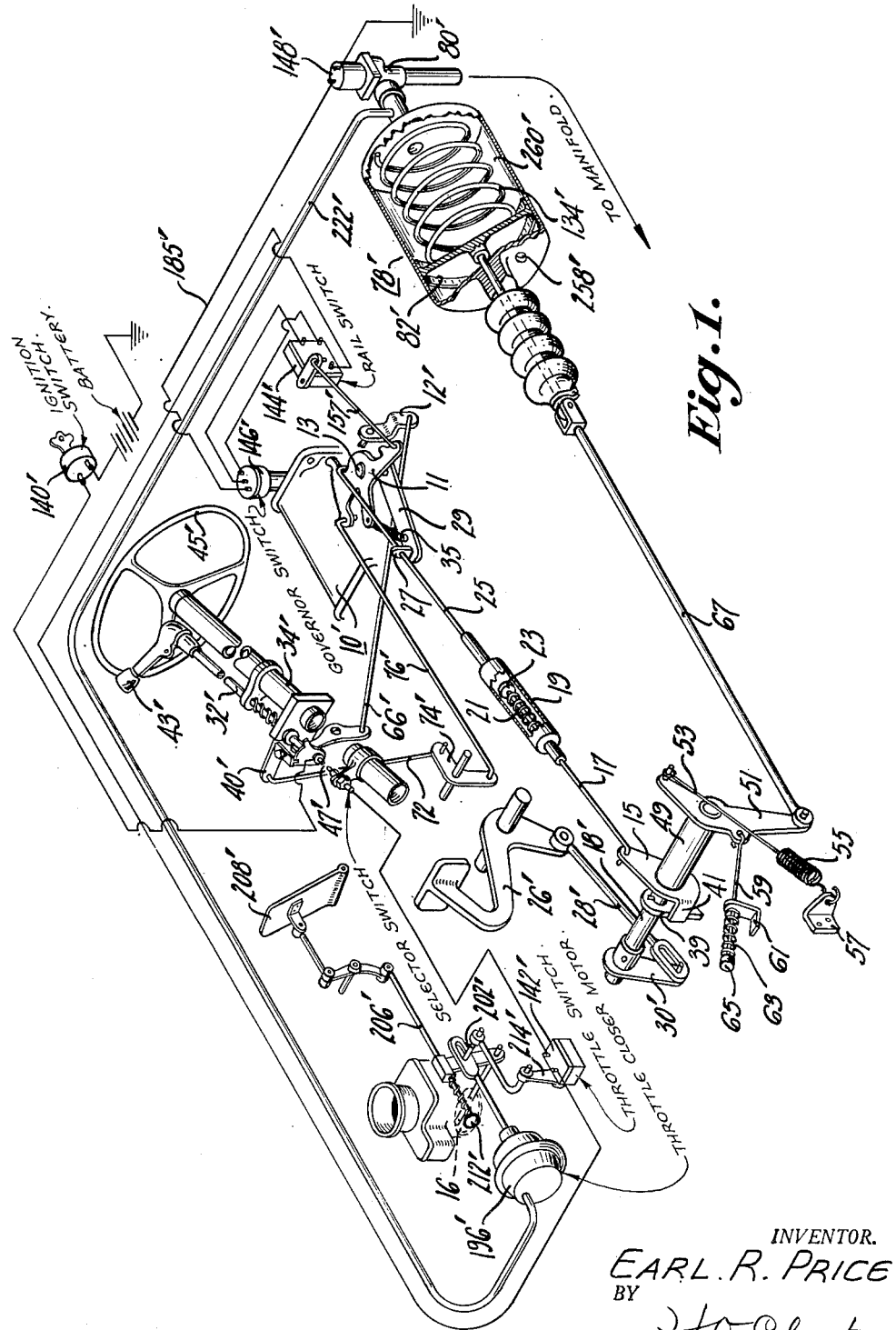
Figure 1 is a diagrammatic view disclosing the combination of elements constituting one feature of my invention said combination including one embodiment of the alternator mechanism.

Referring now to Figure 6 disclosing a preferred embodiment of my invention, a three speeds forward and reverse transmission 10, preferably that used in a 1942 car, is operated by means of a manually operated crank 12 and a manually and power operated crank 14, the crank 12 serving to operate the shift rail selecting mechanism of the transmission and the crank 14 serving to operate that part of the transmission functioning to move the selected rail to establish the transmission in the desired gear ratio. With such a transmission the crank 14 must be moved to its transmission neutral position to neutralize the transmission before the shift rail selecting crank 12 may be operated.

There is disclosed in Figure 6 manually and power operated means for actuating the aforementioned transmission operating cranks 12 and 14; for operating the engine throttle 16, and for operating a conventional friction clutch, not shown, said clutch including the usual driving and driven plates forced into engagement by clutch springs. The aforementioned transmission and the clutch as well as the hereinafter referred to fluid coupling are of conventional design, accordingly, no claim is made thereto and the same are not disclosed in the drawings.

Preferably the mechanism of my invention is incorporated in an automotive power plant including a fluid coupling such for example as that which was incorporated in several 1941 and 1942 passenger vehicles; and said coupling, which is preferably incorporated in the power plant between the engine and the friction clutch, includes an impeller and a vaned runner, the latter serving to drive the aforementioned driving plate of the clutch.

The friction clutch is operably connected to a clutch throw out shaft 18 to which is keyed a crank member 20 contactable by a flange member 22 extending laterally from a crank member 24 rotatably mounted on the shaft 18. The conventional manually operated clutch pedal 26 of the car is drivably connected to the shaft 18 by means of a link 28 and a crank 30 which keyed to the shaft 18. As is disclosed in Figure 6 the connection between the crank 30 and link 28 is of the lost motion type to obviate a movement of the clutch pedal when the clutch is power operated by the mechanism described hereinafter.

One of the features of the mechanism disclosed in Figure 6 lies in the manually and power operated mechanism for operating the clutch operating shaft 18, the transmission operating cranks 12 and 14, and the throttle operating mechanism; all of said mechanism being disclosed in said figure. The shift rail operating cranks 12 and 14 are actuated by force transmitting means including a rotatable and bodily movable shaft 32 extending alongside the steering column 34 of the vehicle. As is disclosed in Figures 6, 11 and 12, the shaft 32 is biased downwardly by a spring 36 positioned between a stop 38 mounted on the steering column and a crank member 40 which is operably connected to said shaft by means of a clutch mechanism 42 described hereinafter. A shift lever 43 mounted beneath the steering wheel 45 is so connected to the shaft 32 that a rotation of said lever in a plane parallel to said wheel effects a rotation of said shaft about its longitudinal axis in the operation of either neutralizing the transmission or establishing the same in a gear setting; and this connection between the shift lever and shaft 32 is also such that the cross-shift movement of the shift lever, that is the movement in a plane perpendicular to the plane of the steering column, results in a movement of the shaft 32 to either effect a shift rail selecting operation of the crank 12 or effect a declutching operation of the clutch 42 and a closing of the selector switch 47 to prepare the mechanism for its power operation.

Describing the aforementioned clutch mechanism 42, said mechanism includes a member 44 sleeved over the lower end of the shaft 32, said member being permanently secured as by brazing to the crank 40. The lower end portion of the member 44 is provided with a flange 46 which is recessed at 48, Figure 11, to provide a keyway for a key portion 50 of a spool-shaped end portion of a clutch member 52, said member being sleeved over and drivably connected by splines 54 to the end portion 56 of the shaft 32. A nut 58, threaded on the end of the shaft portion 56, serves as a stop for the clutch mechanism which is biased downwardly by the operation of the spring 36.

The upper arm 60 of a bell crank lever 62 fits within the spool-shaped portion of the clutch member 52 and the lower arm 64 of said lever is pivotally connected, by a link 66, to the shift rail selecting crank 12. As is disclosed in Figure 12, the spring 36 serves to bias the clutch 42 and shaft 32 as a unit downwardly, the movement being limited by a stop 68, Figure 12, constituting a part of a steering column mounted bracket member 70; and in this position of the clutch 42 the shift rail selector crank 12 is actuated to prepare the transmission for either a second gear or high gear operation, said operation of course depending upon the subsequent actuation of the shift rail operating crank 14. To actuate the crank 12 to prepare the transmission for either a low gear or reverse gear operation, that is a selection of the low and reverse gear shift rail of the transmission, the driver lifts the shift lever 43 upwardly in a plane perpendicular to the plane of the steering wheel; and this operation serves to rotate the bell crank lever 62 in a counter-clockwise direction, Figure 11, the spring 36 being compressed and the flange 46, Figure 12, being moved into engagement with the stop 68. To actuate the shift rail operating crank 14 to neutralize the transmission or establish the same in any one of its four gear ratio settings, the driver rotates the shift lever 43 in a plane parallel to the plane of the steering wheel thereby effecting an angular movement of the crank 40 which is preferably connected to the crank 14 by force transmitting means including link 72, a bell crank lever 74 and a link 76.

There is thus provided, by the above described mechanism, means for manually operating a 1942 three speeds forward and reverse transmission; and in this manual operation of the transmission the shift lever 43 is movable to six different positions, said selective movement outlining the letter H.

An important feature of the mechanism disclosed in Figure 6 lies in the power means for operating the transmission and clutch and said means is diagrammatically disclosed in said figure. The principal element of this power means consists of a single acting fluid pressure motor 78 operably connected to the clutch throw out shaft 18 and to the shift rail operating crank 14; and said motor is controlled by a standard type of solenoid operated three way valve 80, no claim to which is made.

Describing now the details of the aforementioned power means, the power element 82 of the motor 78 is connected to the crank 24 by a link 84; and said crank is yieldingly connected to an alternator or cycling unit 86 by means, preferably including a pin 92 extending from the crank. This cycling unit constitutes the most important feature of my invention and is disclosed in my co-pending application Ser. No. 642,240, filed January 19, 1946. One end of a spring 94, preferably coiled around a link 88, is connected to a pin 96 secured to said link; and the other end of said spring is fastened to the pin 92. A crank 98 of the alternator unit 86 is pivotally connected to the bell crank lever 74 by a link 100.

Figure 8:
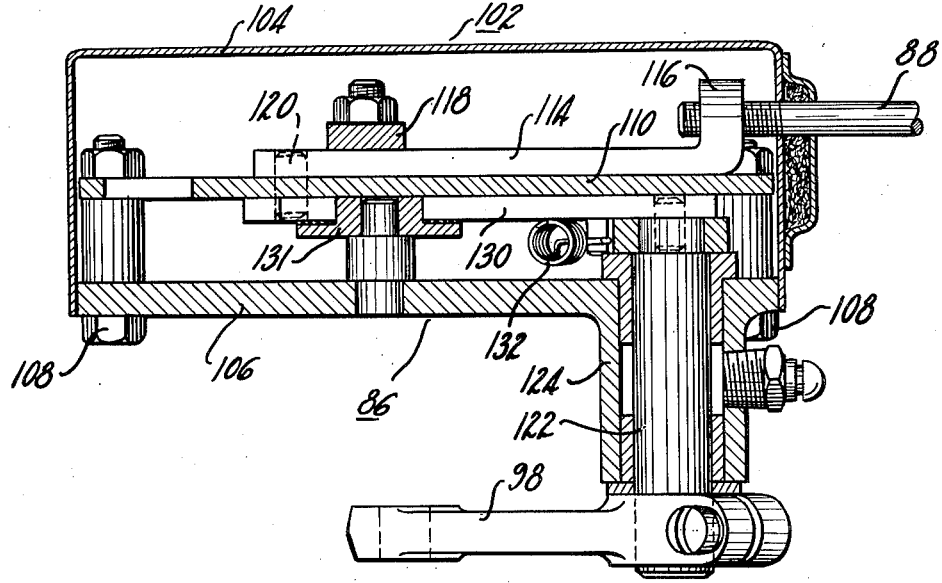
Figure 8 is a sectional view of the alternator unit of Figure 6 said section being taken on the line 8—8 of Figure 7.
Figure 9:
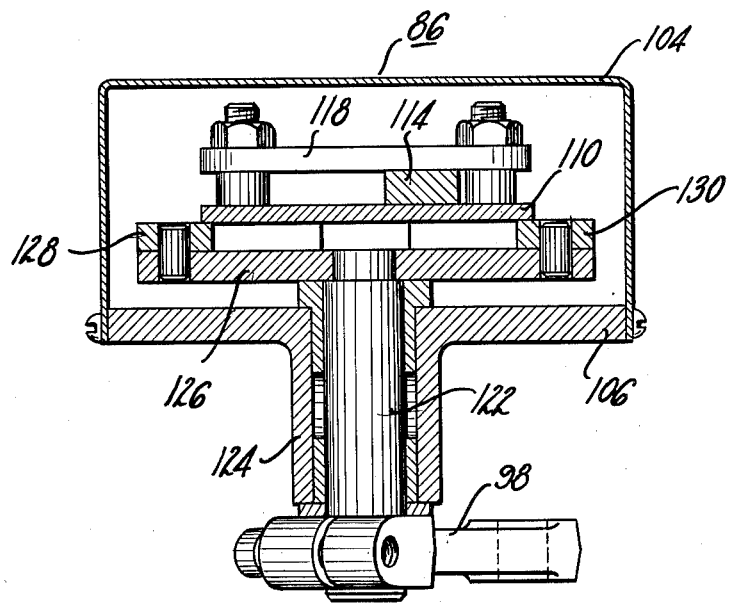
Figure 9 is a sectional view of the alternator unit of Figure 6 said section being taken on the line 9—9 of Figure 7.
Figure 10:
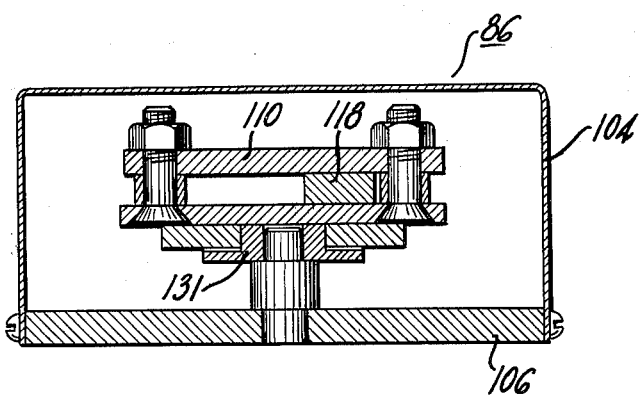
Figure 10 is a sectional view of the alternator unit of Figure 6 said section being taken on the line 10—10 of Figure 7.

Describing now the details of the alternator 86, that is, the direction changing mechanism of my invention, the same includes a casing 102, Figure 8, of two parts 104 and 106. To the casing part 106 there is detachably secured by bolts 108 a guide plate 110 having a V-shaped guide slot 112 therein; and a thrust member 114 adjustably secured at 116 to the link 88 and positioned between a strap 118 and the outer face of the plate 110, is provided with a laterally extending pin 120 which extends through the aforementioned V-shaped slot. To the outer end of a rotatable shaft 122 journalled in a boss 124 extending from the casing part 106 there is drivably connected the aforementioned crank 98, Figure 6; and to the inner end of the shaft 122 there is connected a two-armed crank 126. To one end of said crank there is pivotally connected a thrust link 128 which is recessed at its outer end to receive the pin 120; and to the other end of the lever 126 there is pivotally connected another thrust link 130 which is also recessed at its outer end to receive the pin 120; and the two thrust links are biased towards each other into contact with a guide roller 131 by a spring 132 connected to both of said links.

Figure 7:
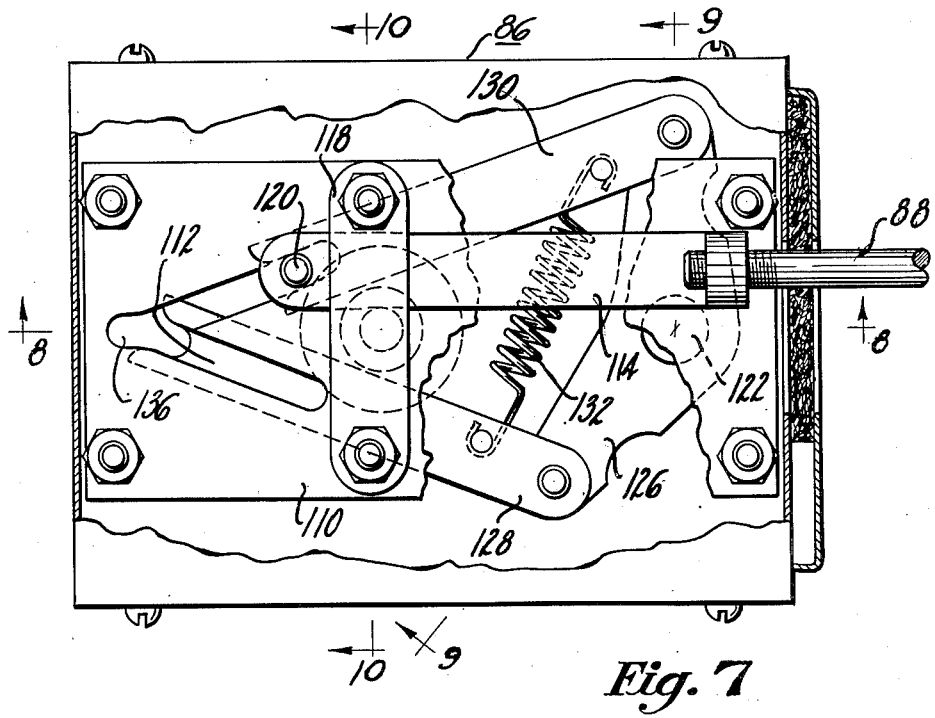
Figure 7 is a view disclosing details of the alternator unit of Figure 6.

Describing the operation of the above described alternator 86, when the fluid pressure motor 78 is de-energized a return spring 134 therein together with the clutch springs, serve to move the link 88 and thrust member 114 connected thereto to the left, Figure 7, to position the pin 120 within a recess 136 constituting the apex of the aforementioned V-shaped guide slot 112; then when the motor 78 is energized to effect an operation of the transmission and clutch the pin 120, after moving a relatively short distance, rests within the recessed end of one or the other of the thrust links 128 and 130, depending upon whether the transmission is at the time established in second gear or in high gear. Continued movement of the thrust member 114 then results in a rotation of the lever 126 to rotate the crank 98 to establish the transmission in its new setting; and as will be noted from an inspection of Figure 7 the operation of the lever 98 serves to move the then inoperative thrust link into position preparatory for its operation to rotate the lever 126.

There is thus provided an alternator or direction changing means whereby the transmission operating angular movement of the crank 14 is alternately reversed with each successive energization of the single acting motor 78. With this mechanism the link 88 constitutes an input member and the link 100 an output member, the reciprocatory power movement of the latter serving to actuate the crank 14.

Figure 2:
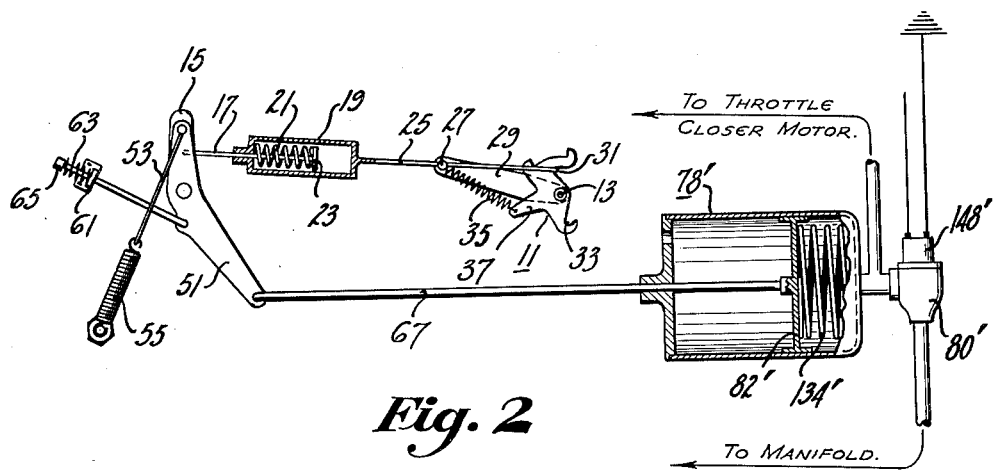
Figure 2 is a diagrammatic view disclosing the position of the parts of the alternator mechanism of Figure 1 when the fluid pressure motor is energized to establish one of two certain settings of the transmission.
Figure 3:
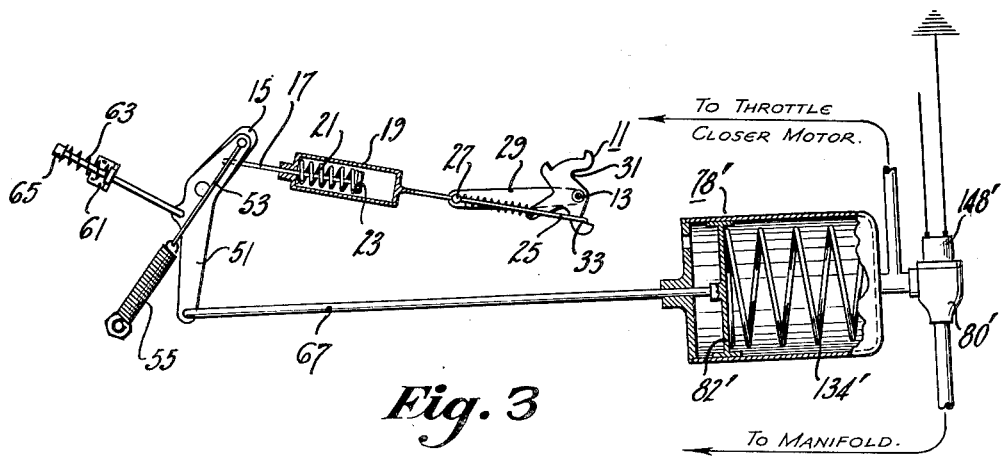
Figure 3 is a diagrammatic view disclosing the positions assumed by the parts of the alternator mechanism of Figure 1 after the fluid pressure motor is de-energized the parts having been moved from the position disclosed in Figure 2 to the position disclosed in Figure 3.
Figure 4:
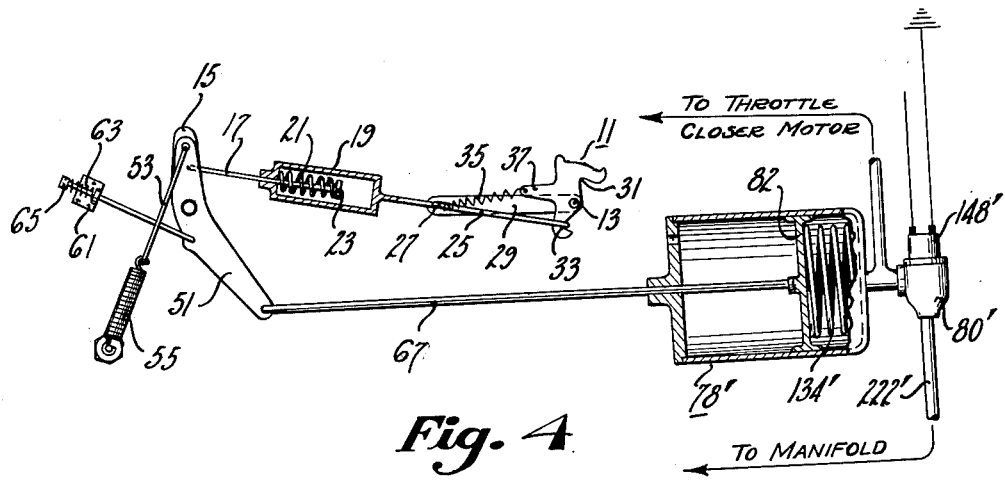
Figure 4 is a diagrammatic view disclosing the position assumed by the parts of the alternator mechanism of Figure 1 when the fluid pressure motor is energized to establish the other of the aforementioned two certain settings of the transmission.
Figure 5:
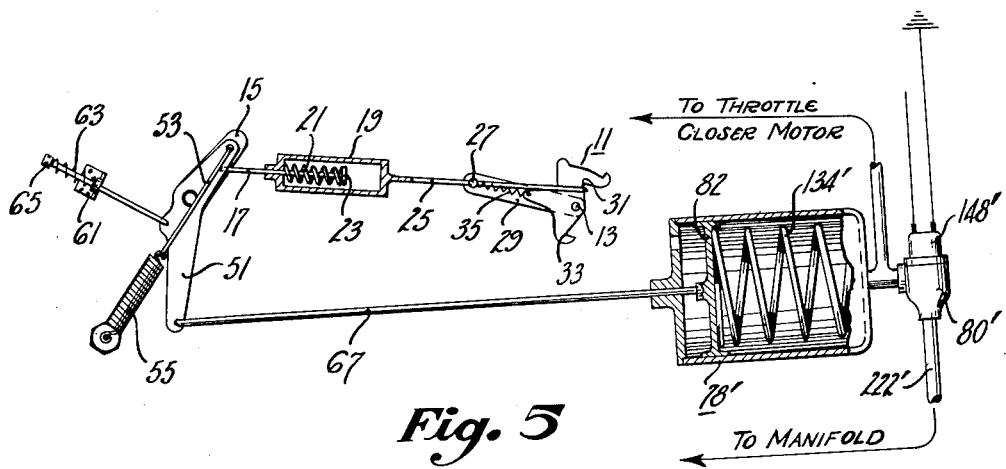
Figure 5 is a diagrammatic view disclosing the position of the parts of the alternator mechanism of Figure 1 after the fluid pressure motor is de-energized the parts having moved from the position disclosed in Figure 4 to the position disclosed in Figure 5.

As to the means for controlling the operation of the motor 78, said means includes the electrical mechanism disclosed in Figures 6 and 2; and this mechanism comprises a grounded battery 138, the ignition switch 140 of the car, the aforementioned shift lever operated, that is selector switch 47, an accelerator operated breaker switch 142 which is closed when the accelerator is released, a shift rail operated switch mechanism 144, a vehicle speed responsive governor operated switch mechanism 146 and a grounded solenoid 148 which operates the motor controlling three way valve 80. The aforementioned switch mechanisms are electrically interconnected as disclosed in Figure 17, and of said mechanisms the accelerator operated switch is of a conventional breaker switch construction; accordingly, the same is not disclosed in detail.

Figure 14:
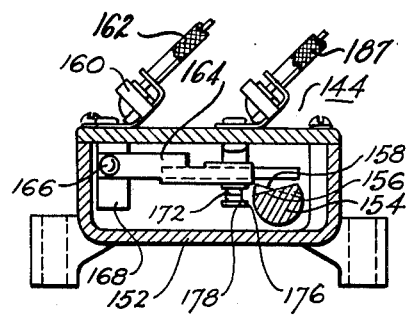
Figure 14 is a sectional view disclosing details of the transmission operating cut out switch of the invention, said view being taken on the line 14—14 of Figure 15.
Figure 15:
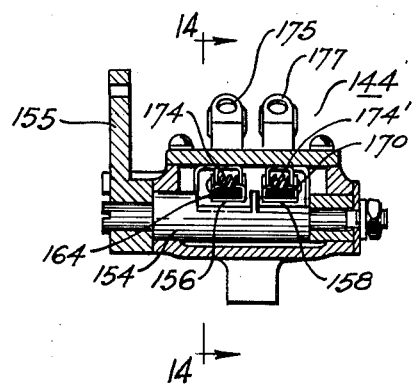
Figure 15 is a sectional view of the transmission operated cut out switch of my invention.

As to the rail switch mechanism 144, which is disclosed in Figures 14 and 15 in its transmission neutral position, the same includes a two part casing 152 having journalled therein a switch operating cam shaft 154, and said shaft is provided with an inclined flat 156 and an oppositely inclined flat 158. A crank 155 is secured to the end of the shaft 154 and said crank is connected to the shift rail operating crank 14 by a link 157. A switch terminal 160 receives a hot wire 162, Figure 6, and to this terminal there is electrically connected a movable switch member 164 of electrical conductive material and which is pivotally connected at 166 to a post 168 secured to the inner face of the casing. Another movable switch member 170, electrically connected, by a conductor 167 to the terminal 160 and positioned alongside the switch member 164, is pivotally connected to a post 169 extending inwardly from the casing; and to said movable switch members 164 and 170 there are secured switch contacts 172 and 173 respectively. Torsion springs 174 and 174' serve to bias the switch members 164 and 170 downwardly to move the aforementioned switch contacts 172 and 173 into engagement with fixed switch contacts 176 and 181 which are mounted on supports secured to the switch casing, one of said supports being indicated by the reference numeral 178, Figure 14, and the other of said supports being indicated by the reference numeral 183. The contacts 176 and 181 are electrically connected, by the aforementioned support members, to terminals 175 and 177, Figure 15, which are wired, by wires 183 and 187 respectively, to the governor operated switch 146.

Describing the operation of the switch mechanism 144, when the transmission operating crank 14 is rotated clockwise by the power means to establish the transmission in its second gear setting the switch operating crank 155 is also moved in a clockwise direction; and this operation serves to rotate the cam shaft 154 clockwise, Figure 14, to open the switch 173, 181 mounted alongside the switch 172, 176 said operation of the switch 173, 181 being effected just as the second gear setting of the transmission is being completed. Now it is to be noted from an inspection of Figure 14 that when the switch mechanism 144 is in its transmission neutral position that both of the aforementioned switches of said mechanism are closed; and for that matter said switches 172, 176 and 173, 181 are both closed except when the transmission is established in either second gear or high gear; for an inspection of the electrical circuits of Figure 17 will reveal that to insure the heretofore described shuttling operation of the motor 78, particularly the vacuum energization of said motor to complete its operation of disengaging the clutch and resetting the transmission, it is necessary to maintain both switches 172, 176 and 173, 181 closed until either the high or the second gear operation of the transmission is completed. When crank 14 is rotated counterclockwise to establish the transmission in its third gear setting, the switch 172, 176 is opened the companion switch 173, 181 remaining closed; and as with the above-described operation of the switch 173, 181 the opening of the switch 172, 176 is effected just as the high gear setting of the transmission is being completed.

Describing the governor operated switch mechanism 146, this mechanism includes a two part casing 180 housing a centrifugally operated governor mechanism 181 which is drivably connected to the propeller shaft of the vehicle or some other moving part of the power plant, the speed of which is directly proportional to the speed of the vehicle. A thrust member 182 of the centrifugal mechanism contacts the central portion of a movable switch contact member 184 which is biased into engagement with a fixed contact 186 by a spring 188. The parts of this switch mechanism are so constructed and arranged and so operative that when the vehicle is at a standstill or is travelling at or below a relatively low speed, for example 10 M. P. H., then the spring 188 serves to move the movable contact member 184 into engagement with the fixed contact 186; and when the vehicle is traveling above governor speed, that is the aforementioned 10 M. P. H., then the centrifugally operated governor mechanism 181 is operative to force the contact 184 into engagement with a fixed contact member 190. Completing the description of the switch mechanism 146 the other end of the movable contact member 184 is electrically connected to a wire 185 which is connected to the solenoid 148.

Now the parts of the shift rail operated switch 144 are so operative and so cooperate with the governor operated switch 146 that an electrical circuit from the accelerator operated switch 142 to the solenoid 148 is completed when the transmission is established in either second gear or high gear and the governor is operated to close one of the two switches operated thereby; for it is to be remembered that the switches 172, 176 and 173, 181 are both closed except when the transmission is established in either second gear or high gear the switch 172, 176 being opened when the latter setting of the transmission is completed and the switch 173, 181 being opened when the second gear setting of the transmission is completed. In other words, just as the second gear setting of the transmission is being completed, one of the switches of the mechanism 144 is broken, the other switch being at the time made to thereby prepare for a high gear operation of the mechanism of my invention; then when the speed of the vehicle goes above governor speed, the motor 78 is again energized to effect the high gear setting of the transmission. It is to be remembered, however, that the above discussed electrical circuits are completed to effect an energization of the motor 78 only when the accelerator is released to close the switch 142.

There is also provided in the mechanism of Figure 6 means for insuring a closure of the engine throttle 194 as the motor 78 is operating to actuate the transmission and clutch; for if such a mechanism were not provided, then a depression of the accelerator prior to a completion of the operation of the transmission and clutch would, by virtue of the opening of the switch 142, prevent the completion of these operations. Furthermore, such a depression of the accelerator would result in an undesirable racing of the engine while said operations were being effected.

Accordingly, the power means of my invention preferably includes a single acting fluid pressure motor 196 having its power element operably connected with a throttle operating crank 198 by means of a link 200, said link being provided with a slotted end portion through which extends a pin 202 secured to said crank. Through a boss 204 secured to the crank 198 there extends a rod 206 connected to the accelerator 208 of the vehicle, a compression spring 210 being interposed between said boss and a stop 212 secured to the end of said rod. The accelerator operated switch 142 is actuated by a crank 214 which is operably connected to the pin 202 by a link 216; and the throttle operating crank 198 is biased to its throttle closed position by a spring, not shown.

Describing the operation of the above described throttle operating mechanism, when the accelerator is released, the switch 142 is closed to make possible the above described power operation of the mechanism of my invention; and with this operation the motor 196 is energized to maintain the crank 198 in its throttle closed position despite a depression of the accelerator during said operation; for if said accelerator is so operated, then the spring 210 is further compressed.

At this juncture it is to be noted that the transmission and clutch operating fluid motor 78 and the throttle operating fluid motor 196 are both disclosed as being vacuum operated; however, said motors may, if desired, be energized by any other suitable power medium. The three way valve 80 of the motor 78 of Figure 6 is connected by a conduit 218 to the intake manifold of the internal combustion engine of the vehicle, said manifold providing a convenient source of vacuum when the engine is idling; and to a duct 220, interconnecting the valve 80 with the motor 78 there is connected a conduit 222 which is connected to the throttle operating motor 196. It is apparent, therefore, that the valve 80 serves to control both of the motors 78 and 196, said motors being operated at the same time.

Describing now the complete operation of the mechanism of my invention, and incidentally completing the description of the parts of said mechanism not heretofore described, it will be assumed that the three speeds forward and reverse transmission 10 is neutralized and that the car is at a standstill with the engine idling, thereby making of the intake manifold of said engine a source of vacuum. The driver will then probably wish to establish the transmission in its low gear setting whereupon he will first manually depress the clutch pedal 26 to disengage the clutch and will then operate the shift lever 43 to manually effect said setting. The accelerator will then be depressed as the clutch is re-engaged to get the car under way; and after the desired car speed is reached, the shift lever and clutch pedal are again operated to establish the transmission in its second gear setting. The car being then under way in second gear at the desired speed, the driver will probably wish to be relieved of the operation of the transmission and clutch; accordingly, to effect this result he will manually disengage the clutch and then move the shift lever to its automatic position, that is, one of the six selective positions of said lever. Describing the latter operation of the shift lever 43, which at the time is in its second gear setting, is rotated downwardly that is angularly in a clockwise direction in a plane perpendicular to the plane of the steering wheel; and this operation serves to bodily move the shaft 32 downwardly until a movable contact member 224, Figure 11, of the selector switch 47 is in contact with a fixed contact 226 of said switch to close the same. This operation constitutes a declutching operation the clutch mechanism 42, the clutch member 52 moving away from the clutch member 44 the movement of the latter being prevented by the stop 68.

Figure 11:
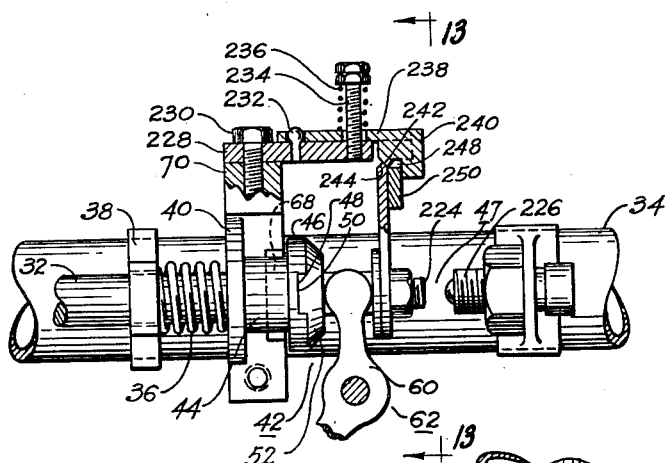
Figure 11 is an enlarged view of the mechanism at the base of the steering column said mechanism serving to disconnect the shift lever from the power operated transmission operating linkage.
Figure 12:
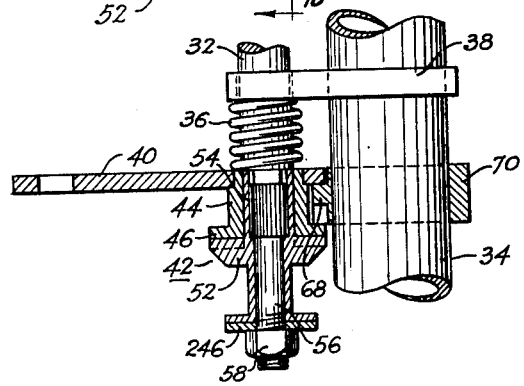
Figure 12 is a sectional view, taken on the line 12—12 of Figure 13, disclosing certain features of the mechanism disclosed in Figure 11.
Figure 13:
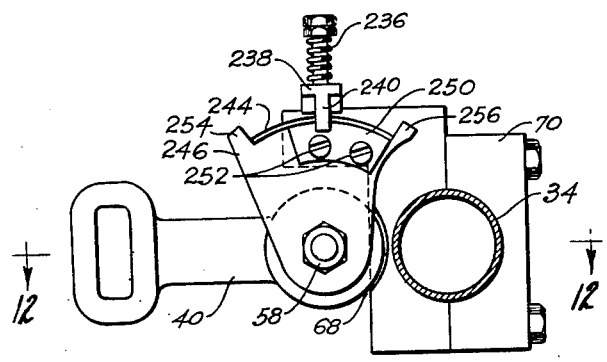
Figure 13 is a front view, taken on the line 13—13 of Figure 11, of the mechanism disclosed in said figure.

Referring to Figures 11 and 13 there is disclosed a latch mechanism for holding the shift lever in its automatic position, said mechanism including a relatively narrow rectangular shaped support member 228 preferably detachably secured to the bracket member 70 by a bolt 230; and there is mounted on said support member, by means of a guide pin 232, a bolt 234 and a spring 236, a movable latch member 238 shaped at its outer end to provide a relatively narrow stop member 240. Now when the shift lever 43 is moved to its automatic position a relatively narrow wedge-shaped flange portion 242 of the member 238 is rocked and/or bodily lifted, against the tension of the spring 236, by the camming action of a wedge-shaped peripheral edge portion 244 of a stop member 246 which is secured to the pin 56, Figure 12, between the lower flange portion of the clutch member 52 and the nut 58; and this operation serves to position said peripheral edge portion 244 in the space indicated by the reference numeral 248, Figure 12. Incidentally the shift rail selecting mechanism of the transmission and the cooperating transmission parts are so constructed that the crank 62 may be moved beyond its second and high shift rail selective position in effecting the above described automatic setting of the shift lever.

Now at this juncture it is to be noted, from an inspection of Figure 13, that a rectangular shaped stop member 250, secured to the outer face of the stop member 246 by screws 252, is in contact with the member 240 when the parts are in their transmission neutral position and when the spring 36 has operated to move the crank 12 to its second and high shift rail position, that is the position preparing the transmission for either second or high gear operation. It follows therefore that the stop member 246 must be rotated clockwise in Figure 13 so that the member 250 will clear the member 240 before the shift lever may be moved downwardly to its automatic position, that is, the position to close the switch 47; and it becomes apparent from the above description that the parts of the mechanism are so constructed and arranged that this automatic setting of the shift lever may only be effected after said shift lever has been moved to establish the transmission in its second gear setting. Referring to Figure 13 of the drawings in this position of the parts, that is the second gear setting, a stop 254 on the member 246 will contact the side of the members 228 and 238 and the stop member 250 will be positioned to the right of the member 240. Completing the description of the member 246 a stop 256 is provided thereon to contact one side of the members 228 and 238 when the shift lever is moved to either its low or high gear position.

Figure 16:
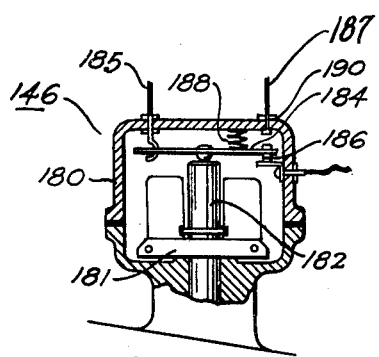
Figure 16 is a sectional view disclosing details of the governor operated switch of the invention.

Continuing the description of the operation of the mechanism the driver having moved the shift lever to its automatic position and assuming that the car is travelling above governor speed to close the switch 184, 186, Figure 16, the transmission will then be automatically established in its high gear setting after the driver releases the accelerator to close the switch 142;

for with this operation an electrical circuit is completed via the grounded battery 138, the ignition switch 140, the then closed selector switch 47 the then closed accelerator operated switch 142, the switch 172, 176 of the rail switch 144, the switch 184, 190 of the governor operated switch 146 and the grounded solenoid 148. The resulting operation of the three way valve 150 effects an energization of the motors 196 and 78 the piston 82 of the latter being then subjected to a differential of pressures to move the same to the right, Figure 6. The left side of the piston 82 is at all times subjected to the pressure of the atmosphere via an opening 258 in one end of the motor and the right side of said piston, that is, the side constituting a wall of compartment 260, is subjected to a relatively low gaseous pressure when the three way valve 150 is opened to interconnect said compartment with the intake manifold or other source of vacuum. When the latter valve is closed, that is, when the solenoid 148 is de-energized, the compartment 260 is vented to the atmosphere through said valve and the spring 134 within said compartment is then operative to move the piston 82 to the left, Figure 6, to permit a re-engagement of the friction clutch.

Describing the clutch disengaging and transmission operating operation of the motor 78 the above referred to rightward movement of the piston 82 serves to rotate the crank 24 to disengage the clutch; and as this operation is being effected the spring 94 is expanded inasmuch as the rod 88 can not be moved to operate the transmission until after the driving torque is reversed, that is, until after the clutch is disengaged. Now immediately after the clutch plates are moved out of contact with each other to reverse the driving torque the above described force transmitting means interconnecting the rod 88 and crank 14 becomes operative to move said crank and establish the transmission in its high gear setting; and as this operation of the transmission is being completed the rail switch 144 becomes operative to break the switch 172, 176. Now the breaking of the switch 172, 176 results in a deenergization of the solenoid 148 and as described above this results in a deenergization of the motor 78 and 196 to permit a re-engagement of the clutch and an opening of the throttle. At this juncture it is to be remembered that when the alternator 86 is operated in the operation of establishing the transmission in its high gear setting said alternator is at the same time operated to preselect a subsequent operation of the transmission to establish the same in its second gear setting; incidentally Figure 7 discloses the parts of the alternator in their high gear setting.

Now as described above during this power operation of the mechanism in establishing the transmission in its high gear setting the throttle 16 is held closed by the then energized motor 196 thereby preventing a racing of the engine.

The transmission will now remain in its high gear setting until the car is slowed down below governor speed and the accelerator is released whereupon the motors 78 and 196 will again be energized to establish the transmission in its second gear setting and to operate the clutch and throttle to facilitate said operation. If the car is then brought to a stop without neutralizing the transmission, that is leaving the shift lever in its automatic setting, the operation of the fluid coupling of the power plant will obviate a stalling of the engine despite the relatively high gear ratio setting of the transmission and despite the fact that the idling engine is at the time directly connected to the then stationary propeller shaft of the vehicle.

There is thus provided a simple, effective and efficient manually and power operated mechanism for operating the transmission, clutch and throttle of an automotive vehicle; and the clutch pedal, the shift lever and the accelerator constitute the only manually operated controls of said mechanism. With the mechanism of my invention the driver may manually operate the clutch and the three speeds forward and reverse transmission in a conventional manner, that is, by operating the clutch pedal and by effecting the H movement of the shift lever; then if he desires an automatic operation of the transmission to alternately establish the same in its second and high gear settings he has only to move the shift lever from its second gear setting to its automatic setting. Thereafter for all normal straight ahead driving of the vehicle the driver need only operate the accelerator. However, if the car becomes mired he probably will, after a manual disengagement of the clutch, operate the shift lever to establish the transmission in its low gear setting; and to reverse the direction of movement of the car the driver, of course, must first manually disengage the clutch and then operate the shift lever to establish the transmission in its reverse gear setting. Referring to the modification of my invention disclosed in Figure 6 it is to be noted that in effecting a manual operation of the transmission to establish the same in any one of its settings, there is no movement of the link 88 and parts connected thereto including the motor piston 134; accordingly with such a construction, that is with a mechanism including the particular type of cycling mechanism disclosed in Figures 6 to 9 inclusive, the presence of the power means in the mechanism does not impede a manual operation of the transmission.

If a second gear setting of the transmission is desired when the transmission is established in its high gear setting and the shift lever is positioned in its automatic setting, then the driver will, after manually disengaging the clutch, first move the shift lever out of its automatic setting whereupon he will successively rotate the shift lever to its high gear position to mesh the clutch members 44 and 52 and then rotate said lever to its second gear position.

There is disclosed in Figure 1 another embodiment of my invention said embodiment differing only from the embodiment disclosed in Figure 6 by the inclusion of an alternator mechanism which differs in some respects from the alternator mechanism of the latter figure; in other words the mechanism disclosed in Figure 1 operates in the same manner as the mechanism of Figure 6 with the exception that the alternator mechanisms of the two figures are of somewhat different construction. However, both of said mechanisms accomplish the same end, that is, both provide means for effecting reciprocatory movement of the transmission operating member as a result of successive power movements of the power element of a single acting fluid pressure motor. The parts of the entire mechanism disclosed in Figure 1 which duplicate like parts in the mechanism of Figure 6 are given the same reference numerals with the addition of a prime; and detailed description of said like parts and their operation is not given herein such description being unnecessary for an understanding of the invention.

Describing now the details of the alternator mechanism of Figure 1 and referring to Figures 2 to 5, inclusive, which disclose the four operative positions of said mechanism, a two-armed crank II which constitutes a power operated output member of the mechanism is drivably connected to a shaft 13 which is connected to transmission operating means, not shown, operative to establish the three speeds forward and reverse transmission 10' either in its high gear setting or its second gear setting. The crank II, which corresponds to the crank 14 of Figure 6 in its operation, is pivotally connected to a manually operable link 76' and said crank is also pivotally connected to a switch operating link 157'. The upper arm of a two-armed crank 15 corresponding in its operation to the crank 24 of Figure 6, is pivotally connected to a link 17; and the latter preferably extends through one end of a hollow connecting member 19. A spring 21 sleeved over one end of the link 17, is interposed between a stop member 23 secured to the latter end of said link and the inner face of one end of the hollow member 19. The latter member is preferably connected to a link 25 which is sleeved through a post 27 swivelled in the outer end of a crank-like member 29; and the latter member is preferably rotatably mounted at its other end upon the shaft 13. The link 25 is preferably bent laterally at its outer end, said bent portion being adapted to nest within one or the other of recesses 31 and 33 of the two-armed crank II. A spring 35, connected at one of its ends to the post 27 and at its other end to an arm 37 secured to the crank II, serves to rotate the member 29, to thereby move the link 25 into registry with one or the other of the recesses 31 and 33 in the crank II. In other words the member 29, the arm 37 and the spring 35 together serve as means cooperating to bias the link 25 into engagement with one or the other of the recesses 31 and 33. This operation of the mechanism will be described in greater detail hereinafter. Incidentally, it is to be noted that the spring 21 is stronger than the spring 35.

The lower and laterally extending arm 41 of the crank 15, Figure 1, is adapted to contact a crank 39 to effect a disengagement of the clutch when the crank 15 is rotated counterclockwise by an operation of the pressure differential operated motor 78'. To the central portion of the crank 15 there is fixedly secured a hollow shaft 49 which is sleeved over the clutch operating shaft 18'. A two-armed crank 51, fixedly secured to the end of the hollow shaft 49, is pivotally connected at one of its ends to a rod 53 the latter being connected to a tension spring 55 which is secured at its lower end to a fixedly mounted bracket 57. A rod 59, pivotally connected to the crank 51 is preferably sleeved through a fixedly mounted bracket 61; and a compression spring 63, interposed between the bracket 61 and a stop 65 on one end of the link 59, is sleeved over the end of said link. Completing the description of the alternator mechanism of Figure 1, the power element 82' of the motor 78' is connected to one end of the crank 51 by means of a rod 67; and this rod constitutes the input member of the mechanism corresponding to the input member 88 of the alternator mechanism of Figure 6.

Describing now the operation of the alternator mechanism of Figures 1 to 5, inclusive, when the motor 78' is energized to successively disengage the clutch and operate the transmission the cranks 51 and 15 are rotated counter-clockwise thereby rotating the crank 39 counter-clockwise to disengage the clutch. During this operation of the clutch, springs 63 and 21 are compressed this operation of the spring 21 being effected by virtue of the fact that the link 25 is held fast by the meshed gears of the transmission. Immediately after the driving torque of the engine is reversed by the disengagement of the clutch there results an operation of the transmission to establish the same in its new setting. Explaining this operation it is to be remembered that the spring 21 is compressed as the clutch is being disengaged; and it is also to be noted that the tension spring 55 operates to rotate the crank 51 counter-clockwise after the link 53 passes to the left of its dead center position with respect to the center of the shaft 18', Figure 1. It follows, therefore, that immediately after the clutch is disengaged the springs 55 and 21 function to move the link 25 to the left, Figure 1, thereby rotating the crank II counter-clockwise to operate the transmission; and in this operation the spring 35 is elongated, that is cocked, for a subsequent operation of the member 29 and the crank member 29 is rotated clockwise.

It will be assumed for the purposes of this description that in the above described operation the transmission is established in its second gear setting and that the parts of the alternator mechanism assume the positions disclosed in Figure 2 just as the motor is completing its operation of the transmission. Now as described above in the description of the operation of the mechanism of Figure 6, the switch 144' is opened as the second gear operation of the transmission is being completed thereby breaking the electrical circuit to the solenoid 148'; and the latter operation results in a de-energization of the motor 78' thereby making possible a re-engagement of the clutch. As the clutch is being re-engaged there is effected what may be termed a high gear preselecting operation of the alternator mechanism of Figures 2 to 5 inclusive. Describing the latter operation the parts of the alternator mechanism assume the positions disclosed in Figure 3 the motor spring 134' being aided by the operation of the springs 55 and 63 to move the link 17 to the right; and this movement of the link results in a movement of the link 25 to the right thereby permitting the cocked spring 35 to operate to rotate the member 29 counter-clockwise. In this operation there is effected a clockwise angular movement of the links 17 and 25 and the members 21 and 19 as a unit about the pivotal connection between the crank 15 and the link 17. And during this operation the bent end of the link 25 moves into registry with the recess 33. The alternator mechanism is then prepared for a subsequent operation to establish the transmission in its high gear setting.

It will be assumed now that the car speed is increased sufficiently to effect the high gear setting of the governor switch 146', that is the closing of the switch contacts 184 and 190; and it will also be assumed that the accelerator is then released to close the switch 142'. When these operations are effected the motor 78' is again energized to successively disengage the clutch and establish the transmission in its high gear setting. In this operation the parts of the alternator mechanism move from the positions disclosed in Figure 3 to the positions disclosed in Figure 4 the crank 51 and springs 55 and 21 repeating the power operation described above.

In effecting this high gear operation of the transmission the crank 11 is rotated clockwise. As the high gear setting of the transmission is being completed the switch 172, 176 is opened to again de-energize the solenoid 148' thereby initiating a de-energization of the motor 78'. When the latter operation occurs the clutch is re-engaged, the springs 63, 55 and 134' functioning to again move the link 17 and connected parts to the right to the position disclosed in Figure 5 and the cocked spring 35 functions, after the bent end of the link 25 leaves the recess 33, to rotate the member 29 clockwise to the position disclosed in said figure. There is at all times a component of force exerted by the spring 35 biasing the link 25 either upwardly or downwardly as the case may be. The alternator mechanism is, by this preselecting operation, prepared for a subsequent second gear operation of the mechanism.

There is thus provided a simple, effective and easily serviced direction changing mechanism adapted to be incorporated in the transmission operating mechanism of an automotive vehicle. It is to be noted, however, that the use of the direction changing mechanism of my invention is not limited to the power plant of an automotive vehicle. However, the alternator mechanism of my invention, including an output member and a motor operated input member, is preferably used as a part of a transmission and clutch operating mechanism of an automotive vehicle said mechanism including a single acting fluid pressure motor and being operable in one cycle of operations to disengage the clutch, operate the transmission and then re-engage the clutch.

The instant application constitutes a continuation in part of my application Ser. No. 642,240, filed January 19, 1946.

Although this invention has been described in connection with certain specific embodiments, the principles are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A direction changing mechanism adapted to be operated by a pressure differential operated motor and adapted to actuate a change speed transmission mechanism, said direction changing mechanism including a two-armed transmission operating crank, a piston and spring operated lever, and means, including a rod and including a yieldable means, interconnecting the lever and crank, the parts of the mechanism being so constructed and arranged and so operative that the rod is alternately connected to first one arm and then the other arm of the crank and after its connection with an arm is completed said rod is then moved to effect a power operation of the crank.

2. A cycling mechanism for effecting first an angular movement of a member to be actuated and then a subsequent angular movement of said member in the opposite direction, said mechanism including a two-armed crank member, an input member movable in one direction to effect a power operation of the aforementioned member to be actuated and movable in the opposite direction to effect a preselecting operation of the cycling mechanism, a force transmitting link pivotally connected to one arm of said crank, a force transmitting link pivotally connected to the other arm of said crank and lying alongside the first mentioned link, a spring interconnecting said links and biasing the same toward each other, force transmitting means connected to said input member and including an element which is successively moved into contact with first one link and then the other link, and means for guiding the latter element toward the link to be contacted.

3. Force transmitting means for alternately effecting the movement of a link in one or the other of opposite directions, said means including a casing, a rotatable shaft journalled in one of the side walls of said casing and extending therethrough, a crank member mounted on the end of said shaft and lying just outside the casing, a bell crank lever mounted on the other end of said shaft and therefore housed within the casing, a plate housed within the casing and secured thereto, said plate having a V-shaped guide slot therein, a thrust link pivotally connected to one end of the bell crank lever, another thrust link pivotally connected to the other end of the latter lever, yieldable means connected at its ends to said links and biasing the same toward each other, an operating link extended within the casing alongside the aforementioned plate and a thrust pin secured to one end of and extending transversely of the operating link said thrust pin extending through the aforementioned V-shaped guide slot and adapted to contact the end of one or the other of the aforementioned thrust links.

4. Power means for operating, in one cycle of operations, the friction clutch and change speed transmission of an automotive vehicle, said means including a single acting fluid pressure operated motor comprising a power element, valve means for controlling the operation of said motor, means for controlling the operation of said valve means to first effect an energization of the motor to successively disengage the clutch and operate the transmission and then effect a de-energization of the motor to make possible a re-engagement of the clutch; and force transmitting means interconnecting the power element of the motor, the clutch and the transmission, said force transmitting means including an alternator mechanism, comprising a two-armed transmission operating crank and a force transmitting link connected to the power element, for rendering said force transmitting means operative to alternately effect two settings of the transmission by a succession of power operations of the power element of the single acting motor.

5. Power means for operating, in one cycle of operations, the friction clutch and change speed transmission of an automotive vehicle, said means including a single acting fluid pressure operated motor comprising a power element, valve means for controlling the operation of said motor, means for controlling the operation of said valve means to first effect an energization of the motor to successively disengage the clutch and operate the transmission and then effect a de-energization of the motor to make possible a re-engagement of the clutch; and force transmitting means interconnecting the power element of the motor, the clutch and the transmission, said force transmitting means including a yieldable member operative to make possible a disengagement of the clutch prior to an operation of the transmission, and further including an alternator mechanism, comprising a two-armed transmission operating crank and a force transmitting link connected to the power element, for rendering said force transmitting means operative to alternately effect two settings of the transmission by a succession of power operations of the power element of the single acting motor.

6. A direction changing force transmitting unit including a casing, a guide plate housed within said casing said plate being provided with a guide slot, a rotatable shaft journalled in the casing, a crank adapted to be connected to the work to be actuated said crank lying outside the casing and being connected to one end of the shaft, a two-armed crank housed within the casing and fixedly secured to the other end of said shaft, force transmitting thrust links pivotally connected to the latter crank, and a thrust member extending within the casing and adapted to be operably connected to first one end and then the other of the thrust links.

7. A power plant mechanism including a power input member, a power output member, means interconnecting said members including a change speed transmission, means interconnecting the power input member and transmission including a friction clutch, and means for successively operating the clutch and transmission, the operation of the latter being such as to alternately effect two different settings thereof, said latter means including a single acting pressure differential operated motor, valve means for controlling the operation of said motor, means, including a manually operated switch and a governor operated switch, for controlling the operation of the valve means, force transmitting means interconnecting the power element of the motor and the clutch, and force transmitting means, including yieldable means and direction changing means, interconnecting the aforementioned force transmitting means and the transmission.

EARL R. PRICE.

REFERENCES CITED

The following references are of record in the file of this patent:

UNITED STATES PATENTS

| Number | Name | Date |
| --- | --- | --- |
| 2,187,824 | Britton | Jan. 23, 1940 |
| 2,222,913 | Pescara | Nov. 26, 1940 |
| 2,351,067 | Randol | June 13, 1944 |
| 2,528,772 | Neracher | Nov. 7, 1950 |
| 2,532,945 | Robinson | Dec. 5, 1950 |

FOREIGN PATENTS

| Number | Country | Date |
| --- | --- | --- |
| 387,311 | Great Britain | Apr. 27, 1931 |